United States Patent [19]

Musschoot

[11] Patent Number: 5,054,606
[45] Date of Patent: Oct. 8, 1991

[54] CONTROL SYSTEM FOR VIBRATORY APPARATUS

[75] Inventor: Albert Musschoot, Barrington, Ill.

[73] Assignee: General Kinematics Corporation, Barrington, Ill.

[21] Appl. No.: 444,959

[22] Filed: Dec. 4, 1989

Related U.S. Application Data

[60] Division of Ser. No. 192,728, May 11, 1988, abandoned, which is a continuation-in-part of Ser. No. 21,526, Feb. 26, 1987, abandoned, which is a continuation of Ser. No. 586,633, Mar. 6, 1984, abandoned, which is a continuation of Ser. No. 279,342, Jul. 1, 1981, abandoned.

[51] Int. Cl.$^5$ ............................................. B65G 25/00
[52] U.S. Cl. ..................................... 198/751; 198/761; 198/762
[58] Field of Search ................ 198/761, 762, 751, 770

[56] References Cited

U.S. PATENT DOCUMENTS

| | | | |
|---|---|---|---|
| 2,376,791 | 5/1945 | Lindsay | 198/762 |
| 3,128,911 | 4/1964 | Morris et al. | 198/762 X |
| 3,216,557 | 11/1965 | Morris et al. | 198/761 X |
| 3,434,586 | 3/1969 | Morris | 198/762 |
| 3,716,130 | 2/1973 | Morris | 198/762 |
| 3,822,604 | 7/1974 | Grimmer | 198/770 X |
| 4,015,705 | 4/1977 | Dumbaugh | 198/770 |
| 4,088,223 | 5/1978 | Bertrand | 198/761 |
| 4,216,416 | 8/1980 | Grace | 198/762 X |

FOREIGN PATENT DOCUMENTS

| | | | |
|---|---|---|---|
| 2806223 | 8/1979 | Fed. Rep. of Germany | 198/762 |
| 2935739 | 3/1981 | Fed. Rep. of Germany | 198/762 |

Primary Examiner—Robert P. Olszewski
Assistant Examiner—James R. Bidwell
Attorney, Agent, or Firm—Wood, Phillips, Mason, Recktenwald & Van Santen

[57] ABSTRACT

The invention relates to a control system for a vibratory apparatus such as vibratory feeders and vibratory conveyors. An accelerometer is provided for sensing the acceleration of vibratory movement of the vibratory apparatus. The signal generated by the sensing system is transmitted to a control which is capable of modifying the amplitude or the frequency of the vibratory movement imparted to the apparatus and thereby to regulate the operation of the vibratory conveyor or feeder.

6 Claims, 1 Drawing Sheet

CONTROL SYSTEM FOR VIBRATORY APPARATUS

CROSS REFERENCE TO RELATED APPLICATIONS

This is a division of application U.S. Pat. Ser. No. 192,728 filed May 11, 1988, which is now abandoned and which is a continuation-in-part of prior application U.S. Pat. Ser. No. 021,526, filed Feb. 26, 1987 which is now abandoned and which is a continuation of prior application U.S. Pat. Ser. No. 586,633, filed Mar. 6, 1984, which is now abandoned and which is a continuation of prior application U.S. Pat. Ser. No. 279,342, filed on July 1, 1981, which is now abandoned.

BACKGROUND OF THE INVENTION

Vibratory feeding and vibratory conveying apparatus systems have been in use for many years. While initially such systems were primarily fixed rate, i.e., the vibrations were of a fixed amplitude or at a fixed frequency, more recently systems have been devised to vary the amplitude or frequency of the vibratory movement of such devices. Where the vibration generating system includes an electric motor, the development of a squirrel cage motor has provided a variable speed motor capable of varying the frequency of the vibratory movement. As the frequency approaches or departs from the natural frequency of the system, the amplitude of the vibrational movement imparted is varied In addition, other systems may vary the vibratory force imparted to the vibrating apparatus, for example, the system shown in my U.S. Pat. No. 3,358,815.

The foregoing systems, however, provided primarily for manual adjustment of the amplitude or frequency, usually by visual operation of the feed or conveying speed and manual adjustment to achieve a desired result, or they may be at least partially automatic as shown in my U.S. Pat. No. 4,168,774.

SUMMARY OF THE PRESENT INVENTION

According to the present invention, a control system is provided whereby a vibratory feeding system or conveying system can be set to achieve and maintain a predetermined desired rate of feed or movement. The system includes means mounted on the vibrating material-carrying member for sensing the acceleration of the vibrations. The sensing means is connected to a control which is effective to either vary the vibratory frequency or the vibratory amplitude in order to meet a desired condition of operation.

DESCRIPTION OF THE PREFERRED EMBODIMENT

Figure 1:
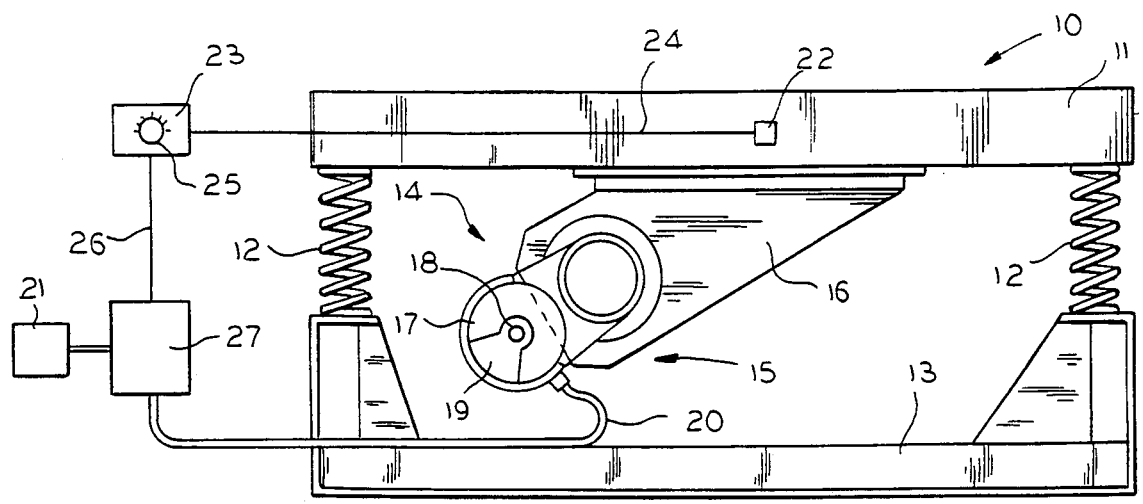
FIG. 1 is a side elevational view of a two-mass vibratory feeding system according to the invention operable to control vibrational amplitude.

Referring to FIG. 1 of the drawings, there is shown a two-mass vibratory system which includes a vibratory apparatus 10 similar in construction to the vibratory apparatus shown in my U.S. Pat. No. 3,358,815. Thus, the system includes a material-carrying member in the form of a trough 11 mounted on isolation springs 12 extending between the trough 11 and a base 13. A vibratory generating means 14 includes an exciter member 15 connected to a frame 16 secured to the material-carrying member 11. The connection between the exciter member 15 and the frame 16 is through a plurality of rubber shear springs such as shown in my said U.S. Pat. No. 3,358,815. Thus, the system shown is a two-mass system, the trough 11 constituting one mass and the exciter member 15 a second mass, with the two masses being connected together by conventional springs The exciter member 15 includes an electric motor 17 having a shaft 18 carrying a variable eccentric weight 19 thereon. The variable eccentric weight 19 comprises a fixed weight and a movable weight. The movable weight is movable relative to the fixed weight responsive to fluid pressure. A fluid pressure line 20 is connected to a source 21 of fluid under pressure and to the exciter member 15 to controllably move the movable weight from a first position on the opposite side of the shaft from the fixed weight to a second position on the same side of the shaft as the fixed weight. Illustratively, in the first position the movable weight counterbalances the fixed weight and no vibratory force is imparted. In the second position the movable weight adds to the fixed weight to produce maximum vibration. Otherwise, vibration is controllably variable in a range from no vibration to maximum vibration according to the position of the movable weight relative to the fixed weight, as controlled by the fluid pressure. The movable weight and its system is, as pointed out above, fully shown and described in my said U.S. Pat. No. 3,358,815.

Secured to the trough 11 is a conventional accelerometer 22 sensitive to the vibratory movement of the trough 11 and capable of generating a signal responsive to such vibratory movement. The signal generated by the accelerometer 22 represents linear acceleration caused by vibratory movement of the trough 11. This acceleration is defined by the equation $$A = k(f)^2 S$$

wherein A represents acceleration, k is a constant which is dependent, in part, on the weight of the trough 11 and the material carried thereon, and f is the frequency and S is the amplitude of the vibratory movement sensed by the accelerometer 22. The signal generated by the accelerometer 22 may be, for example, an analog signal which varies over a preselected range, e.g., 0-5 volts, according to the sensed acceleration.

With a vibratory feeding system, the feed rate can be varied by varying the trough stroke. This can be done by varying either the vibratory frequency or amplitude. The use of an accelerometer 22 according to the invention permits a feeding system to selectively control either the vibratory amplitude or frequency. If it is desired to control amplitude, then the frequency is maintained at a constant level as by using a constant speed motor. Conversely, if it is desired to control the frequency, then a variable speed motor is utilized without the need for a variable eccentric weight.

The embodiment described herein relative to FIG. 1 provides for control of the trough stroke by varying the vibrational amplitude. Particularly, the accelerometer 22 is connected to a control 23. The control 23 includes a user settable device 25 for setting a desired operating condition, such as the feed rate. The motor 17 develops a substantially constant speed. Therefore, the vibrational frequency remains constant, as the vibration frequency is proportional to the motor speed. Accordingly, in the above equation the acceleration A is directly variable as a function of the vibrational amplitude S. As discussed above, the feed rate is dependent on the stroke of the trough 11 which is represented by the amplitude S. Therefore, the feed rate can be controlled by controlling the trough stroke. This is done directly by varying the position of the movable weight of the eccentric weight 19, as discussed above.

Specifically, the control 23 compares the desired feed rate represented by the position of the user settable device with the acceleration signal on the line 24 to develop an error signal on a line 26. The error signal represents the difference between the desired feed rate, or trough stroke, and the acceleration, which is a function of amplitude. The line 26 is connected to a transducer 27 which is connected in the fluid line between the fluid source 21 and the exciting member 15. The transducer 27 may be, for example, an I/P transducer which converts current to pressure so that the pressure applied to the exciting member 15 varies proportionally to the error signal. The control 23 thereby serves to modulate the fluid pressure from the fluid pressure source 21 to position the movable weight to modify the vibrational amplitude, and the trough stroke, to satisfy the desired condition.

For example, if the system is in a balanced condition, and it is desired to increase the feed rate, then the setting member 25 is adjusted to call for a higher feed rate, or trough stroke. This adjustment produces an immediate increase in the error signal on the line 26 resulting in the movable weight being positioned to further add to the eccentric weight to produce a greater vibrational amplitude, thereby producing an increased trough stroke, and thus feed rate. Ultimately, the system returns to a balanced condition albeit at a higher feed rate.

The vibrating feeding system of FIG. 1 is also operable to maintain the trough stroke and feed rate regardless of the material load on the trough 11. Particularly, as the material load on the trough 11 increases, the trough stroke and thus acceleration decreases. The control 23 responsive to the decreased acceleration causes the movable weight to vary to provide a corrective action on vibrational movement to maintain the trough stroke. This control action operates similarly for both increasing and decreasing loads.

Figure 2:
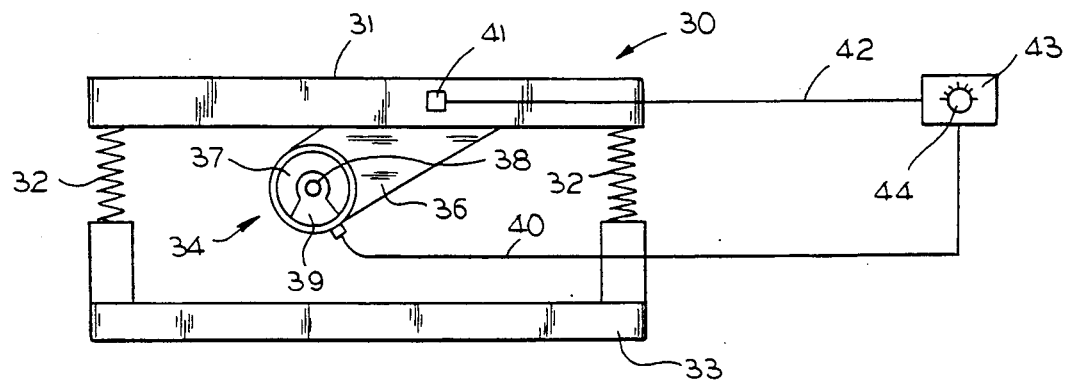
FIG. 2 is a view similar to FIG. 1 of a single mass vibratory feeding system operable to control vibrational frequency.

In the form of the invention shown in FIG. 2, a vibratory feeding system is provided which is operable to control feed rate as by controlling vibrational frequency. Specifically, there is provided a single mass vibratory feeding system 30 including a trough 31 mounted on isolation springs 32 in turn mounted on a base 33. A vibration generating means 34 includes a frame 36 secured to the trough 31 upon which frame is mounted an electric motor 37 having a shaft 38 which carries an eccentric weight 39. The motor 37 is a squirrel cage type motor whose speed can be adjusted by regulating the voltage or frequency applied, and the power for operating the motor 37 is delivered thereto through an electrical signal line 40. An accelerometer 41, similar to the accelerometer 22, above, is mounted on the trough 31 and generates a signal responsive to the vibratory movement which signal is transmitted on a signal line 42 to a control 43. The control 43 includes a user adjustable setting device 44 for setting a desired operating condition, such as the feed rate.

The eccentric weight 39 provides a fixed imbalance. Therefore, the trough stroke and thus feed rate is controlled by varying the vibrational frequency as by varying the speed of the motor 37. As is well known, speed of an AC squirrel cage type motor can be varied by varying frequency of the voltage applied thereto. The control 43 therefore compares the desired feed rate represented by the user settable device 44 with the acceleration signal on the line 42 to develop an error signal. The control 43 is thus responsive to the error signal to control the frequency of voltage applied to the motor 37 on the line 40, as is well known. Moreover, with a system wherein the frequency is controlled, a speed transducer could be utilized for sensing the speed of the motor in a closed loop control system in order to maintain more accurate control over motor speed, and thus vibrational frequency.

Figure 3:
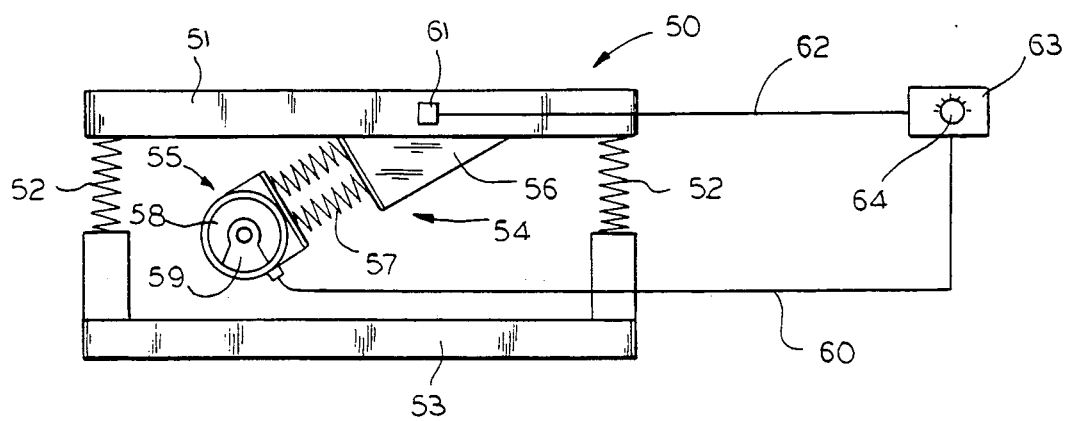
FIG. 3 is a view similar to FIG. 2 for a two-mass feeding system.

The form of the invention shown in FIG. 3 is similar to the one shown in FIG. 2 except that the vibration generating means is a two-mass system employing a squirrel cage motor. Referring to FIG. 3, there is shown a vibratory feeding apparatus 50 provided with a material carrying member in the form of a trough 51 supported on isolation springs 52 mounted on a base 53. The vibration generating means 54 is in the form of an exciter 55. A frame 56 is secured at its upper end to the trough 51 and carries at its lower end a plurality of springs 57. Secured to the springs 56 is an electrical motor 58 of the squirrel cage type having a shaft carrying an eccentric weight 59 similar to the weight 39 in FIG. 2.

An accelerometer 61, similar to the accelerometer 41 of FIG. 2, is secured to the trough 51 and connected by line 62 to a control 63 similar to the control 43 and similarly carrying a user adjustable device 64. Vibration intensity is sensed by the accelerometer 61 and transmitted to the control 63. The control 63 determines if the sensed intensity is different from a desired intensity set by the device 64 and responsive thereto generates a modulating electrical frequency signal which is transmitted to the motor 58 through the line 60 in response to such variations to vary motor speed to maintain the desired vibration intensity.

I claim:

1. A vibratory apparatus comprising:
    a material carrying member;
    exciter means in operative relationship with the material carrying member for imparting a vibratory force on the material carrying member and comprising a motor and a rotatable eccentric counter weight connected to the motor to be rotated thereby, said motor comprising a variable speed motor operational at a speed controlled by frequency of voltage applied thereto;
    an accelerometer for sensing the acceleration of vibratory movement of said material carrying member, said accelerometer developing a signal having a level representing vibrational frequency of said material carrying member;
    user adjustable means for setting a desired operating condition of said vibratory apparatus; and
    control means coupled to said accelerometer, said user adjustable means and said exciter means for automatically controlling frequency of voltage applied to said motor to controllably vary the speed of the motor to vary the vibratory force responsive to a difference between said sensed vibration frequency and said desired operating condition to maintain the vibratory apparatus at the desired operating condition.

2. The vibratory apparatus of claim 1 wherein said material carrying member comprises a material carrying trough.

3. A vibratory apparatus comprising:
a material carrying member;
a variable speed AC motor operational at a speed controlled by frequency of voltage applied thereto;
a rotatable eccentric counterweight, the counterweight being connected to the motor to be rotated thereby;
means for coupling the motor to the material carrying member for imparting a vibratory force on the material carrying member responsive to rotation of said motor and said counter weight, said vibratory force being variable responsive to speed variation of said motor;
an accelerometer for sensing the acceleration of vibratory movement of said material carrying member, said accelerometer developing a signal having a level representing vibrational frequency of said material carrying member;
user adjustable means for setting a desired operation condition of said vibratory apparatus; and
control means coupled to said sensing means, said user adjustable means and said motor for automatically controllably varying the frequency of voltage applied to said motor responsive to a difference between said sensed vibrational frequency and said desired operating condition to maintain the vibratory apparatus at the desired operating condition.

4. The vibratory apparatus of claim 3 wherein said material carrying member comprises material carrying trough.

5. A vibratory apparatus comprising:
a material carrying member;
a variable speed motor, said motor being operational at a speed controlled by frequency of voltage applied thereto;
a rotatable eccentric counterweight connected to the motor to be rotated thereby;
means for coupling said motor to said material carrying member for imparting a vibratory force on the material carrying member responsive to rotation of said motor and said counterweight, said vibratory force being variable responsive to the variation of the speed of said motor;
an accelerometer for sensing the acceleration of vibratory movement of said material carrying member, said accelerometer developing a signal having a level representing vibrational frequency of said material carrying member;
user adjustable means for setting a desired operating condition of said vibratory apparatus; and
control means coupled to said accelerometer, said user adjustable means and said motor for controlling the speed of said motor by controlling frequency of voltage applied thereto to controllably vary the vibratory frequency responsive to said sensed vibrational frequency and said desired operating condition to maintain the vibratory apparatus at the desired operating condition.

6. The vibratory apparatus of claim 5 wherein said material carrying member comprises a material carrying trough.

* * * * *